United States Patent Office 2,850,377
Patented Sept. 2, 1958

2,850,377

CARBONYL TREATMENT OF NICKEL-CONTAINING LATERITE ORES

Stanley Charles Townshend, Clydach, Swansea, Wales, assignor to The International Nickel Company, Inc., New York, N. Y., a corporation of Delaware No Drawing. Application December 21, 1955
Serial No. 554,397

Claims priority, application Canada December 28, 1954

7 Claims. (Cl. 75—82)

The present invention relates to an improved process for the treatment of lateritic ores containing nickel and, more particularly, to an improved carbonyl process for recovering nickel from silicate type ores.

It is well known to those skilled in the art that silicate ores containing nickel and iron have been difficult to treat. The recovery of nickel from these ores in the presence of iron by the conventional carbonyl process necessitates a reduction treatment to produce metallic nickel. Such metallic nickel is then subjected to the action of carbon monoxide at atmospheric pressure and at a suitable temperature to form volatile nickel carbonyl as practiced in the well-known Mond process. When these silicate ores are reduced with strong reducing gases, such as hydrogen or water gas, at temperatures commonly employed for the reduction of oxides, e. g., 750° F., the resulting nickel extraction as carbonyl is usually less than 50%. In this treatment of silicate ores containing a small amount of nickel and larger amounts of iron, volatile carbonyls are formed which contain up to four times as much iron as nickel. At higher temperatures, such as 950° F., about 50% nickel extraction is obtained whereas about 60% is obtained at 1100° F. In each case, the extracted nickel is associated with about four times its weight of iron. However, when still higher reduction temperatures are used, higher proportions of metallic nickel and iron are formed, but the resulting carbonyl extraction of the nickel will not be increased and will even be appreciably decreased by the use of higher reduction temperatures such as those above 1450° F. Thus, using a reduction temperature of about 1850° F., the extraction is decreased to about 30%. Further illustrations are given in the following table depicting results of the treatment of New Caledonian silicate ore. A typical ore contains 3.3% Ni, 11.3% Fe, 21% MgO and 40% $SiO_2$. The ore was ground to about 100 mesh and was mixed with ½% of powdered iron pyrites. The reduction was effected with dry hydrogen at various temperatures prior to extracting nickel and iron with carbon monoxide at atmospheric pressure. In the following table the time and temperature of reduction is given and the percent extraction of nickel and iron.

| Reduction | | Percent metals extracted by CO | |
|---|---|---|---|
| Hours | ° F. | Ni | Fe |
| 75 | 750 | 36 | 44 |
| 64 | 950 | 48 | 56 |
| 27 | 1,100 | 62 | 50 |
| 8 | 1,300 | 60 | 27 |
| 4.5 | 1,450 | 61 | 38 |
| 3 | 1,650 | 50 | 34 |
| 3 | 1,850 | 33 | 24 |

Although attempts were made to overcome the foregoing difficulties and other disadvantages, none, as far as I am aware, was entirely successful when carried into practice commercially on an industrial scale.

I have discovered a novel carbonyl process which gives unexpected nickel extractions for lateritic ores of the silicate type containing a small amount of nickel and larger amounts of iron.

It is an object of the present invention to provide an improved process for the treatment of lateritic ores of the silicate type containing small amounts of nickel and larger amounts of iron with higher nickel extraction than heretofore practical.

The invention also contemplates providing an improved and practical process involving a two-stage treatment with specially controlled reducing temperatures in the presence of a weak reducing gas to yield surprisingly high extractions of nickel.

It is a further object of the invention to provide an improved process which is capable of treating practically any silicate lateritic ore containing small amounts of nickel and larger amounts of iron and which can be carried into industrial practice on a large scale.

Other objects and advantages will become apparent from the following description.

Generally speaking, the present invention contemplates a two-stage process, utilizing specially controlled conditions, which is effective for the treatment of refractory silicate ores of the foregoing type. In the first stage, the temperature of reduction is specially controlled to not more than about 1100° F. and advantageously at least about 750° F., in the presence of a weak reducing gas comprising not only hydrogen but also an oxidizing gas, such as carbon dioxide and water vapor. The hydrogen may be accompanied by carbon monoxide. In carrying the reduction operation into practice, it is effected in the shortest possible time, which has been found to be several hours. After reduction, the treated ore containing volatilizable metallic nickel and smaller amounts of volatilizable metallic iron is first cooled and is then subjected to treatment with carbon monoxide at atmospheric pressure and at temperatures of the order of about 75° F. to about 150° F. Such treatment causes the formation of nickel carbonyl and smaller amounts of iron carbonyl. This treatment is effective in extracting the major portion of the original nickel present in the ore.

After the first stage, the treated ore is now subjected to a second stage treatment. It has been found that this second stage must involve a relatively high temperature reducing operation utilizing temperatures higher than about 1100° F. and of the order of 1300° F. to about 1600° F. in the presence of a weak reducing gas comprising not only hydrogen but also an oxidizing gas such as carbon dioxide and water vapor. As stated hereinabove, the hydrogen may contain carbon monoxide. In practice, the time of the reducing operation is more than about one hour and preferably about two hours. Following the reducing operation, the treated ore contains volatilizable metallic nickel and smaller amounts of volatilizable metallic iron. Such ore is then cooled and is again subjected to treatment with carbon monoxide at atmospheric pressure and at temperatures of the order of about 75° F. to about 150° F. to cause the formation of nickel carbonyl and smaller amounts of iron carbonyl. In this manner, additional amounts of nickel are extracted from the ore. The total amount of the extraction from the first stage and the second stage gives a value higher than anything which had been accomplished heretofore with carbon monoxide extraction of silicate ores at atmospheric pressure.

It has been discovered that the weak reducing gas must have special proportions of reducing to oxidizing components. When hydrogen and carbon dioxide are used, it has been found that the ratio of hydrogen to carbon dioxide in the furnace inlet gas must be about 1:2 and up to about 2:1 by volume. Instead of carbon dioxide, water vapor may be substituted. When water vapor is used, the ratio is about 0.5:1 up to about 1:1 and preferably about 0.7:1. For industrial practice, a satisfactory ratio of reducing to oxidizing components in the furnace atmosphere is about 1:1.

The silicate-type ores to be treated by the present process are mainly hydrated magnesium silicates and iron oxides in which nickel is present in small amounts, usually between about 1% to about 4%, together with smaller amounts of cobalt, but in which iron is present in larger amounts, usually between about 10% and about 25%.

It has been discovered that this two-stage treatment also gives improved nickel extraction of nickel-containing silicate ores by ammonia leaching instead of by carbonyl extraction.

In carrying the invention into practice, the novel two-stage process was applied to a Venezuelan silicate ore containing about 1.95% nickel and 14.6% iron. The specially controlled temperatures and time are indicated in the following table together with the resulting nickel extraction. It is to be observed that the total nickel extractions are surprisingly high. In contrast, the maximum nickel extraction by the conventional single treatment using high temperatures (e. g., higher than 1100° F., such as about 1500° F.) and a strong reducing gas, such as hydrogen, was only about 65%. Even when a weak reducing gas was used in the conventional single treatment, the extraction was only increased to 78%. If the double treatment suggested by Ludwig Mond, involving merely repetition of the reduction-extraction procedure, is employed only a 3% increase in overall nickel extraction is obtained.

| First stage | | | Second stage | | Total percent Ni ext'n |
|---|---|---|---|---|---|
| Reduction | | Percent Ni ext'n | Reduction | Percent Ni ext'n | |
| Hours | °F. | | Hours | °F. | |
| 5 | 750 | 35 | 2½ | 1,400 | 50 | 85 |
| 4 | 1,000 | 67 | 2 | 1,400 | 21 | 88 |
| 4 | 1,100 | 71 | 2 | 1,400 | 16 | 87 |

For the purpose of giving those skilled in the art a better understanding of the invention, the following illustrative examples are given:

Example I

Venezuelan ore, minus 100 mesh, and analyzing about 1.8% Ni, about 20% Fe, was given a two-stage treatment with a reducing furnace inlet gas mixture consisting of about 25% $CO_2$, about 25% $H_2$ and about 50% $N_2$ in which the first stage reduction consisted of 4 hours' treatment at about 1000° F. and the second stage reduction of 2 hours at about 1400° F. After each reduction the ore was treated with carbon monoxide at atmospheric pressure and at about 120° F. temperature for 18 hours in the first stage and 6 hours in the second stage. This resulted in the total extraction of about 87% of the original nickel in the ore, compared with only about 72% by prior carbonyl methods of treating the ore.

Example II

New Caledonian ore, minus 100 mesh, and analyzing about 2.2% Ni, about 26% Fe, was given a two-stage treatment with a reducing furnace inlet gas mixture consisting of about 25% $CO_2$, about 25% $H_2$ and about 50% $N_2$ in which the first stage reduction consisted of 4 hours' treatment at about 1100° F. and the second stage reduction of 2 hours at about 1400° F. After each reduction the ore was treated with carbon monoxide at atmospheric pressure and at about 120° F. temperature for 18 hours in the first stage and 6 hours in the second stage. This resulted in the total extraction of about 78% of the original nickel in the ore compared with only about 64% by prior carbonyl methods of treating the ore.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The improved process for the treatment of lateritic ores of the silicate type containing small amounts of nickel and larger amounts of iron which comprises comminuting the ore, subjecting said comminuted ore to a first stage reducing treatment at temperatures below 1100° F. in the presence of a relatively weak reducing gas containing reducing and oxidizing components in the ratio of about 0.5:1 to about 2:1 by volume to produce volatilizable nickel and a smaller amount of volatilizable iron, passing carbon monoxide at atmospheric pressure in contact with the reduced ore at temperatures of the order of about 75° F. to about 150° F. to produce nickel carbonyl and smaller amounts of iron carbonyl, withdrawing said nickel carbonyl and iron carbonyl from said treated ore, subjecting said treated ore to a second stage reducing treatment at temperatures above 1100° F. in the presence of a relatively weak reducing gas containing reducing and oxidizing components in the ratio of about 0.5:1 to about 2:1 by volume to produce further amounts of volatilizable nickel and smaller amounts of volatilizable iron, passing carbon monoxide at atmospheric pressure in contact with the treated ore at temperatures of the order of about 75° F. to about 150° F. to produce nickel carbonyl and smaller amounts of iron carbonyl, withdrawing said nickel carbonyl and iron carbonyl from said ore, separating the withdrawn carbonyl into nickel carbonyl and iron carbonyl, and recovering metallic nickel and metallic iron from their respective carbonyls, to effect a higher nickel extraction than would normally be obtained with an extraction process comprising either a one stage reduction-carbonyl extraction or a repetition of the reduction-carbonyl extraction.

2. A process according to claim 1 in which the reducing atmosphere in both stages contains hydrogen and water vapor in the ratio of about 0.5:1 to about 1:1.

3. The improved process for the treatment of lateritic ores of the silicate type containing small amounts of nickel and larger amounts of iron which comprises fine-grinding such ore, subjecting said ground ore to a first stage reducing treatment at relatively low temperatures of about 750° F. to about 1100° F. in the presence of a relatively weak reducing gas containing hydrogen and carbon dioxide in the ratio of about 1:2 to about 2:1 by volume to produce metallic nickel and a smaller amount of metallic iron, passing carbon monoxide at atmospheric pressure in contact with the reduced ore at temperatures of the order of about 75° F. to about 150° F. for several hours to produce nickel carbonyl and smaller amounts of iron carbonyl, withdrawing said nickel carbonyl and iron carbonyl from the treated ore, subjecting said treated ore to a second stage reducing treatment at relatively high temperatures of about 1300° F. to about 1600° F. in the presence of weak reducing gas containing hydrogen and carbon dioxide in the ratio of about 1:2 to about 2:1 by volume to produce further amounts of metallic nickel and smaller amounts of metallic iron, passing carbon monoxide at atmospheric pressure in contact with the treated ore at temperatures of the order of about 75° F. to about 150° F. to produce nickel carbonyl and smaller amounts of iron carbonyl, withdrawing said nickel carbonyl and iron carbonyl from said ore, separating nickel carbonyl from iron carbonyl, and recovering metallic nickel from said nickel carbonyl, to effect a higher nickel extraction than would normally be obtained with an extraction process comprising either a one stage reduction-carbonyl extraction or a repetition of the reduction-carbonyl extraction.

4. The improved process for the treatment of lateritic ores of the silicate type containing small amounts of nickel and larger amounts of iron which comprises fine-grinding such ore, subjecting said ground ore to a first stage reducing treatment at a relatively low temperature of about 1000° F. in the presence of a weak reducing gas containing hydrogen and carbon dioxide in the ratio of about 1:2 by volume to about 2:1 for about four hours to produce metallic nickel and a smaller amount of metallic iron, passing carbon monoxide at atmospheric pressure in contact with said ore at about 120° F. for about 18 hours to produce nickel carbonyl and a smaller amount of iron carbonyl, withdrawing said nickel carbonyl and iron carbonyl from the treated ore, subjecting said treated ore to a second stage reducing treatment at a relatively high temperature of about 1400° F. for about two hours in the presence of the aforesaid weak reducing gas to produce further amounts of metallic nickel and a smaller amount of metallic iron, passing carbon monoxide at atmospheric pressure in contact with the treated ore at a temperature of about 120° F. for about six hours to produce nickel carbonyl and a smaller amount of iron carbonyl, withdrawing said nickel carbonyl and iron carbonyl from said treated ore, separating nickel carbonyl from iron carbonyl by distillation, and recovering metallic nickel from said nickel carbonyl, to effect a higher nickel extraction than would normally be obtained with an extraction process comprising either a one stage reduction-carbonyl extraction or a repetition of the reduction-carbonyl extraction.

5. The improved process for the treatment of lateritic mineral material of the silicate type containing small amounts of nickel and larger amounts of iron which comprises subjecting said lateritic mineral material to a first stage reducing treatment at relatively low temperatures up to not more than about 1100° F. in the presence of a relatively weak reducing gas containing reducing and oxidizing components in the ratio of about 0.5:1 to about 2:1 by volume to produce metallic nickel and a smaller amount of metallic iron, passing carbon monoxide substantially at atmospheric pressure in contact with the reduced lateritic mineral material to produce nickel carbonyl and smaller amounts of iron carbonyl, withdrawing said nickel carbonyl and iron carbonyl from the treated lateritic mineral material, subjecting said treated lateritic mineral material to a second stage reducing treatment at relatively high temperatures of about 1300° F. to about 1600° F. in the presence of weak reducing gas containing reducing and oxidizing components in the ratio of about 0.5:1 to about 2:1 by volume to produce further amounts of metallic nickel and smaller amounts of metallic iron, passing carbon monoxide at substantially atmospheric pressure in contact with the treated lateritic mineral· material to produce nickel carbonyl and smaller amounts of iron carbonyl and withdrawing said nickel carbonyl and iron carbonyl from said ore, to effect a higher nickel extraction than would normally be obtained with an extraction process comprising either a one stage reduction-carbonyl extraction or a repetition of the reduction-carbonyl extraction.

6. The improved process for the treatment of lateritic mineral material of the silicate type containing small amounts of nickel and larger amounts of iron which comprises subjecting said lateritic mineral material to a first stage reducing treatment at relatively low temperatures up to not more than about 1100° F. in the presence of a relatively weak reducing gas containing reducing and oxidizing components in the ratio of about 0.5:1 to about 2:1 by volume to produce metallic nickel and a smaller amount of metallic iron, passing carbon monoxide substantially at atmospheric pressure in contact with the reduced lateritic mineral material to produce nickel carbonyl and smaller amounts of iron carbonyl, withdrawing said nickel carbonyl and iron carbonyl from the treated lateritic mineral material to effect a nickel extraction of about 35% to about 70%, subjecting said treated lateritic mineral material to a second stage reducing treatment at relatively high temperatures of about 1300° F. to about 1600° F. in the presence of weak reducing gas containing reducing and oxidizing components in the ratio of about 0.5:1 to about 2:1 by volume to produce further amounts of metallic nickel and smaller amounts of metallic iron, passing carbon monoxide at substantially atmospheric pressure in contact with the treated lateritic mineral material to produce nickel carbonyl and smaller amounts of iron carbonyl and withdrawing said nickel carbonyl and iron carbonyl from said ore, to effect a higher nickel extraction than would normally be obtained with an extraction process comprising either a one stage reduction-carbonyl extraction or a repetition of the reduction-carbonyl extraction.

7. The improved process for the treatment of lateritic mineral material of the silicate type containing small amounts of nickel and larger amounts of iron which comprises subjecting said lateritic mineral material to a first stage reducing treatment at relatively low temperatures of about 750° F. to about 1100° F. in the presence of a relatively weak reducing gas containing reducing and oxidizing components in the ratio of about 0.5:1 to about 1:1 by volume to produce metallic nickel and a smaller amount of metallic iron, passing carbon monoxide at substantially atmospheric pressure in contact with the reduced lateritic mineral material to produce nickel carbonyl and smaller amounts of iron carbonyl, withdrawing said nickel carbonyl and iron carbonyl from the treated lateritic mineral material, subjecting said treated lateritic mineral material to a second stage reducing treatment at relatively high temperatures of about 1300° F. to about 1600° F. in the presence of weak reducing gas containing reducing and oxidizing components in the ratio of about 0.5:1 to about 1:1 by volume to produce further amounts of metallic nickel and smaller amounts of metallic iron, passing carbon monoxide at substantially atmospheric pressure in contact with the treated lateritic mineral material to produce nickel carbonyl and smaller amounts of iron carbonyl and withdrawing said nickel carbonyl and iron carbonyl from said ore, to effect a higher nickel extraction than would normally be obtained with an extraction process comprising either a one stage reduction-carbonyl extraction or a repetition of the reduction-carbonyl extraction.

References Cited in the file of this patent
UNITED STATES PATENTS

| Number | Name | Date |
|---|---|---|
| 2,212,459 | Simpson | Aug. 20, 1940 |
| 2,221,061 | Simpson | Nov. 12, 1940 |
| 2,254,158 | Simpson | Aug. 26, 1941 |

UNITED STATES PATENT OFFICE
CERTIFICATE OF CORRECTION

Patent No. 2,850,377                                           September 2, 1958

Stanley Charles Townshend

It is hereby certified that error appears in the printed specification of the above numbered patent requiring correction and that the said Letters Patent should read as corrected below.

Column 5, line 11, after "1:2" strike out "by volume" and insert the same after "2:1", same line.

Signed and sealed this 27th day of January 1959.

(SEAL)
Attest:

KARL H. AXLINE                                         ROBERT C. WATSON
Attesting Officer                                      Commissioner of Patents